United States Patent [19]

Iwasaki

[11] Patent Number: 5,101,299
[45] Date of Patent: Mar. 31, 1992

[54] ZOOM LENS SYSTEM

[75] Inventor: Satoshi Iwasaki, Toyokawa, Japan

[73] Assignee: Minolta Camera Kabushiki Kaisha, Osaka, Japan

[21] Appl. No.: 619,936

[22] Filed: Nov. 28, 1990

[30] Foreign Application Priority Data

Dec. 1, 1989 [JP] Japan .................................. 1-312539

[51] Int. Cl.⁵ ............................................ G02B 15/00
[52] U.S. Cl. .................................... 359/676; 359/683; 359/695
[58] Field of Search ............... 350/423, 427, 449, 450, 350/468, 472

[56] References Cited

U.S. PATENT DOCUMENTS

| | | | |
|---|---|---|---|
| 2,600,208 | 6/1952 | Cook | 350/472 |
| 3,649,104 | 3/1972 | Edwards et al. | 350/472 |
| 4,256,374 | 3/1981 | Mickleson | 350/472 |
| 4,268,128 | 5/1981 | Uetake et al. | 350/472 |
| 4,526,443 | 7/1985 | Hirose | 350/472 |
| 4,733,951 | 3/1988 | Pareigat | 350/423 |
| 4,978,204 | 12/1990 | Ito | 350/423 |
| 5,033,832 | 7/1991 | Ito | 350/423 |

*Primary Examiner*—Bruce Y. Arnold
*Assistant Examiner*—Huang Xuan Dang
*Attorney, Agent, or Firm*—Price, Gess & Ubell

[57] ABSTRACT

A zoom lens system comprising, in order from an enlargement side, a first lens unit of a positive power, a second lens unit of a positive power, a third lens unit of a negative power, and a fourth lens unit of a positive power. During a magnification varying operation from a longest focal length condition to a shortest focal length condition, the first lens unit, the third lens unit and the fourth lens unit are movable simply from the enlargement side to a reduction side. The second lens unit is closest to the third lens unit in the longest focal length condition, and closest to the first lens unit in the shortest focal length condition. This zoom lens system satisfies the following conditions:

$$42 = < f_L/f_I = < 5$$

$$4 = < f_L/|f_{III}| = < 13$$

where $f_L$ is a focal length of the entire system in the longest focal length condition, $f_I$ is a focal length of the first lens unit, and $f_{III}$ is a focal length of the third lens unit.

4 Claims, 4 Drawing Sheets $\beta = -\frac{1}{7}$ $\beta = -\frac{1}{10}$

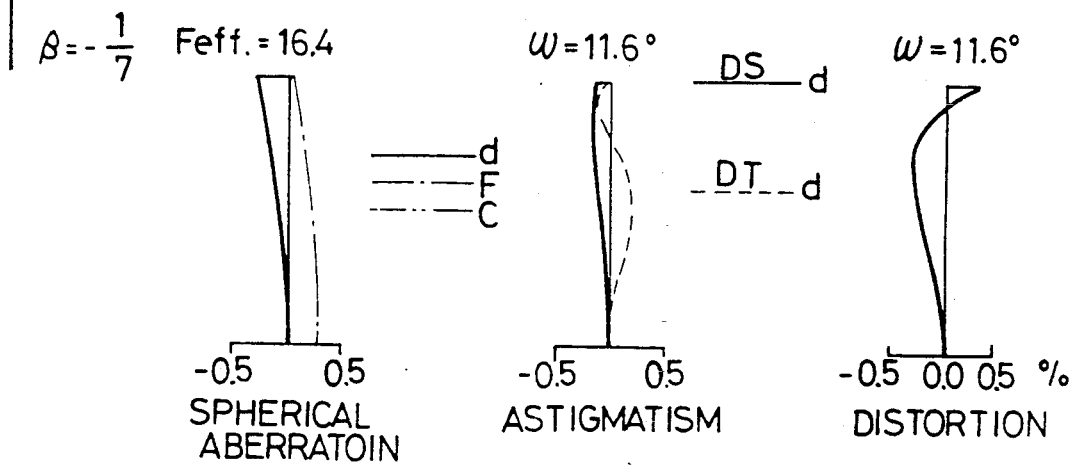
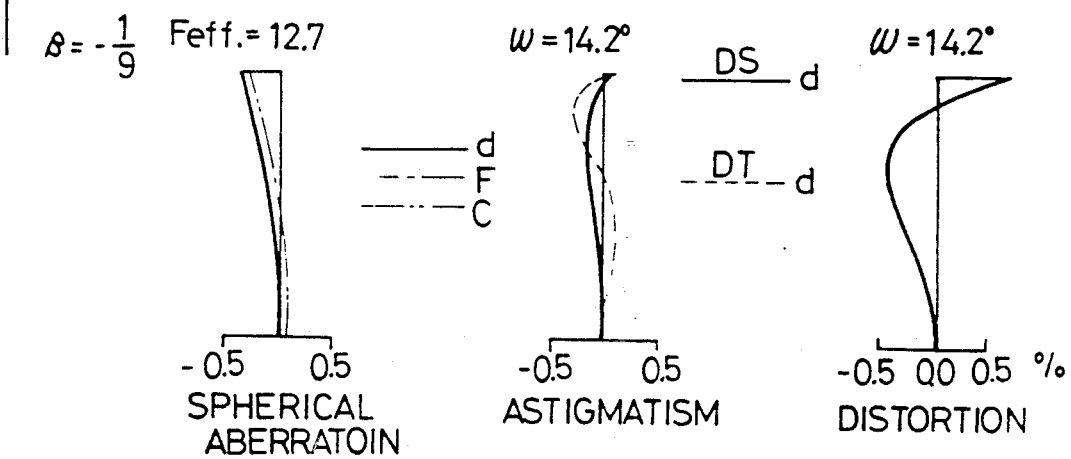
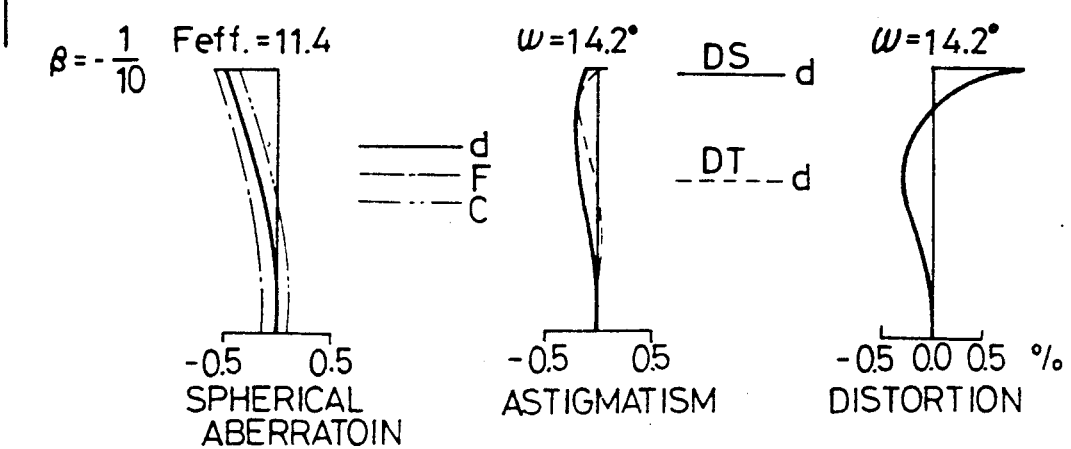

1

ZOOM LENS SYSTEM

TECHNICAL FIELD

The present invention relates to a projecting zoom lens system having a limited conjugate length, for use in a microfilm reader or a microfilm reader/printer including an image rotating mechanism for reproduction of microfilm images.

BACKGROUND OF THE INVENTION

Microfilms are often prepared in a way to include frames arranged irregularly, with some original characters recorded upright and others sideways. Generally, therefore, a microfilm reader or a microfilm reader/printer includes an image rotating prism disposed between a projecting lens and a screen, i.e. at an enlargement side of the projecting lens, for correcting orientation of images for reproduction on the screen.

Since the image rotating prism is disposed at the enlargement side, a limited space is available for accommodating the projecting lens. As a result, a lens system having a short length is required.

This condition sets a great limitation to a projecting lens of about 10 magnifications having a long focal length. It sets even a greater limitation to a zoom lens system having a magnification range on the order of 10-power.

A zoom lens system allowing an image rotating prism to be disposed at the enlargement side is disclosed in U.S. Pat. No. 4,733,951, for example.

This projecting zoom lens system has a large zoom range of 6.5 to 14 magnifications. The lens system is a positive-negative, two-unit lens system comprising a first lens unit having a positive refractive power and including a field stop movable with a zooming operation and a second lens unit having a negative refractive power. This is a very compact and excellent lens system having a telephoto ratio $\propto TL_L/f$ of 0.78 in a longest focal length condition with an object at infinity.

SUMMARY OF THE INVENTION

An object of the present invention is to provide a zoom lens system of increased compactness having a telephoto ratio of 0.64 to 0.66, with a pupil at a reduction side disposed remote from a conjugate plane at the reduction side and moving little during a zooming operation, and various aberrations corrected reliably.

The above objects are fulfilled, according to the present invention, by a zoom lens system comprising, in order from an enlargement side, a first lens unit of a positive power, a second lens unit of a positive power, a third lens unit of a negative power, and a fourth lens unit of a positive power, wherein, during a magnification varying operation from a longest focal length condition to a shortest focal length condition, the first lens unit, the third lens unit and the fourth lens unit are movable simply from the enlargement side to a reduction side, the second lens unit being closest to the third lens unit in the longest focal length condition, and closest to the first lens unit in the shortest focal length condition, and wherein the zoom lens system satisfies the following conditions:

$$2 = < f_L/f_I = < 5$$

$$4 = < f_L/|f_{III}| = < 13$$

where $f_L$ is a focal length of the entire system in the longest focal length condition, $f_I$ is a focal length of the first lens unit, and $f_{III}$ is a focal length of the third lens unit.

As will be clear from the various data noted in the description of the preferred embodiments to follow, the zoom lens system according to the present invention has a compact construction with a very small overall length while being capable of excellent correction of various aberrations. Furthermore, a pupil in the reduction side is positioned relatively far from an image plane in the reduction side. Thus, a projecting apparatus may have a small illuminating system by employing this zooming system. Since there occur little variations with a magnification varying operation, this system is capable of copying with a fixed illuminating system.

The foregoing and other objects, features and advantages of the invention will be apparent from the following more particular description of preferred embodiments of the invention, as illustrated in the accompanying drawings.

BRIEF DESCRIPTION OF THE DRAWINGS

FIGS. 2A, 2B and 2C show aberration curves in the longest focal length condition, an intermediate focal length condition and the shortest focal length condition of the zoom lens system shown in FIGS. 1A and 1B, FIGS. 3A and 3B are views of a lens arrangement in a longest focal length condition and a shortest focal length condition, respectively, of a zoom lens system in a second embodiment of the present invention.

DESCRIPTION OF THE PREFERRED EMBODIMENTS

Figure 1A:
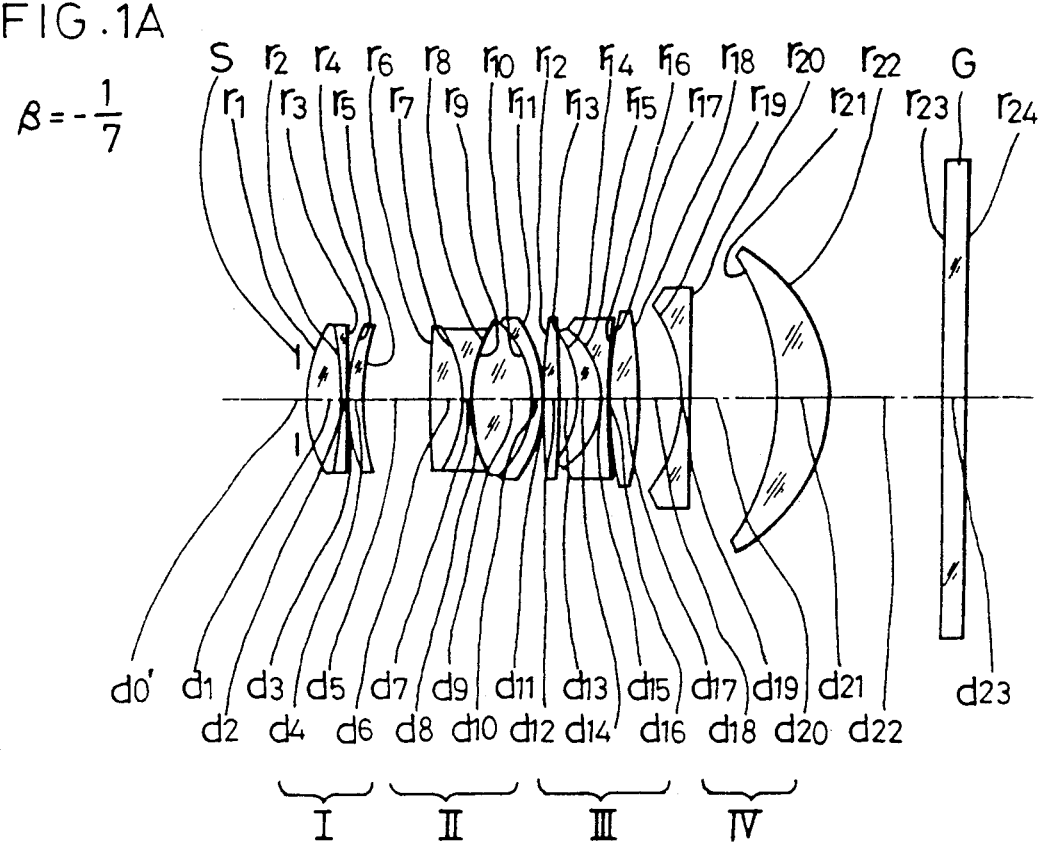
FIGS. 1A and 1B are views of a lens arrangement in a longest focal length condition and a shortest focal length condition, respectively, of a zoom lens system in a first embodiment of the present invention.
Figure 1B:
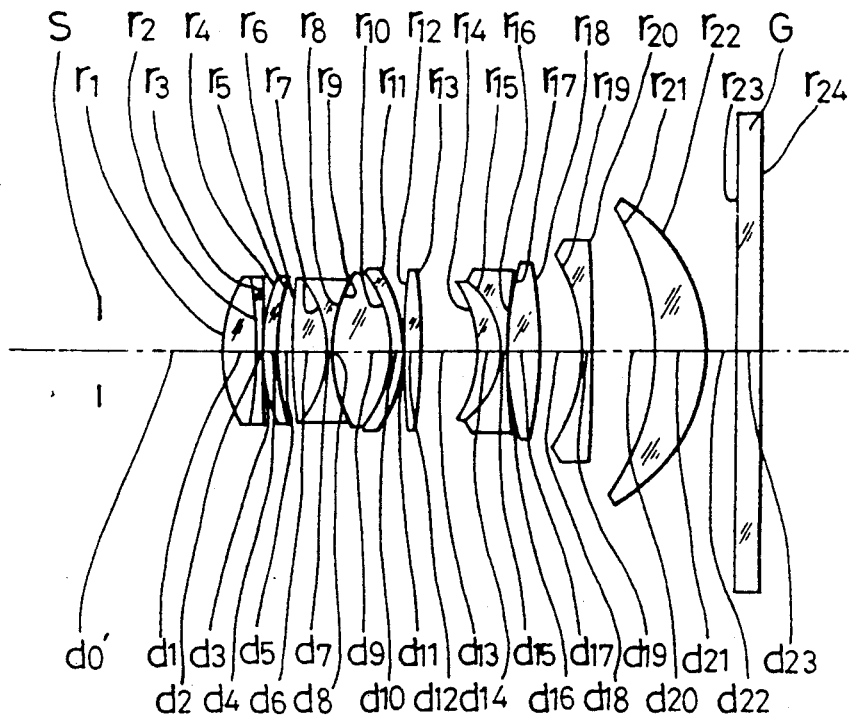

The present invention has two embodiments, and a first embodiment will be described hereinafter with reference to the drawings. FIGS. 1A and 1B show a lens arrangement in the first embodiment. The illustrated lens system comprises, from an enlargement side at the left, a field stop S, a first lens unit I of a positive power, a second lens unit II of a positive power, a third lens unit III of a negative power, and a fourth lens unit IV of a positive power. The first lens unit I includes a first, positive lens $G_1$ and a second, negative lens $G_2$ cemented together, and a third, meniscus lens $G_3$ having a convex surface directed to the enlargement side. The second lens unit II includes a fourth, positive lens $G_4$ and a fifth, negative concave lens $G_5$ cemented together, a sixth, positive lens $G_6$, a seventh, meniscus lens $G_7$ cemented with the sixth lens $G_6$ and having a concave surface directed to the enlargement side, and an eighth, convex lens $G_8$. The third lens unit III includes a ninth, meniscus lens $G_9$ having a concave surface directed to the enlargement side, a tenth, negative concave lens $G_{10}$ cemented with the ninth lens $G_9$, an eleventh, convex lens $G_{11}$, and a twelfth, negative meniscus lens $G_{12}$ having a concave surface directed to the enlargement side. The fourth lens unit IV comprises a thirteen, meniscus lens $G_{13}$ having a concave surface directed to the enlargement side. A flat glass plate G shown at the right-hand side of the drawings is provided for sandwiching a microfilm with another flat glass plate not shown.

In a zooming operation for varying magnification from the longest focal length condition shown in FIG. 1A to the shortest focal length condition shown in FIG. 1B, the first, third and fourth lens units I, III and IV simply move toward the reduction side. The second lens unit II is closest to the third lens unit III in the longest focal length condition shown in FIG. 1A, and closest to the first lens unit I in the shortest focal length condition shown in FIG. 1B.

This arrangement is made in order for the second lens unit II and third lens unit III to produce magnifying effects efficiently with small amounts of movement, respectively, with the power of the third lens unit III satisfying the following formula standardizing its range with a focal length of the entire system in the longest focal length condition:

$$4 \leq f_L/|f_{III}| \leq 13 \qquad (1)$$

where $f_L$ is the focal length of the entire system in the longest focal length condition, and $f_{III}$ is the focal length of the third lens unit III.

Above an upper limit of the above formula, the absolute value of the power of the third lens unit III becomes too large and increases curvature of an image plane generated by the third lens unit III to such an extent that the curvature is difficult to correct with the other lens units. Below a lower limit of this formula, the absolute value becomes too small, which results in an extended overall length of the lens system lacking in compactness. Also, the third lens unit III must move a large amount to obtain the same magnification ratio. This would involve a large portion of sliding contact, rendering the mechanical aspect of designing difficult.

Further, the value of the power of the first lens unit I satisfies the following formula standardizing its range with the focal length of the entire system in the longest focal length condition:

$$2 \leq f_L/f_I \leq 5 \qquad (2)$$

where $f_L$ is the focal length of the entire system in the longest focal length condition, and $f_I$ is the focal length of the first lens unit I. With this feature and the feature satisfying the foregoing conditional expression (1), the lens system as a whole acts as a compact telephoto type lens system having a small overall length and yet a strong positive power in the enlargement side.

Above an upper limit of the above formula (2), the power of the first lens unit I becomes too strong and a negative spherical aberration generated by the first lens unit I becomes difficult to correct with the other lens units. Below a lower limit of the formula (2), the power becomes too small, which results in an extended overall length of the lens system lacking in compactness.

However, the curvature of the image plane tends to become excessive if the third lens unit III has a relatively strong negative power as in the conditional expression (1). It is therefore desirable, as in conditional expression: $0.1 < |D_{III}|/f_L$ (where $f_L$ is the focal length of the entire system in the longest focal length condition, and $D_{III}$ is an overall thickness along an optical axis of the third lens unit) to have a relatively large overall thickness of the third lens unit III. This enables the negative power of third lens unit III to be divided into two parts, with a large space therebetween, thereby reducing the negative power of each lens component.

The fourth lens unit IV has functions to correct off-axial aberrations such as distortion and astigmatism and to form a pupil in the reduction side relatively far from an image plane in the reduction side.

While it is conceivable to move the fourth, positive lens unit IV in the same way as the third lens unit III, the fourth lens unit IV is moved independently to restrain variations in the off-axial aberrations occurring with a zooming operation and to adjust variations in the position of the pupil in the reduction side.

Further, the field stop S is fixed to a position adjacent an end of the enlargement side of the zoom lens system. This reduces a beam width at the end of the enlargement side and maintains the beam width constant throughout different magnifications. In addition, this construction allows the zoom lens system to be compatible with a small image rotating prism.

Figure 3A:
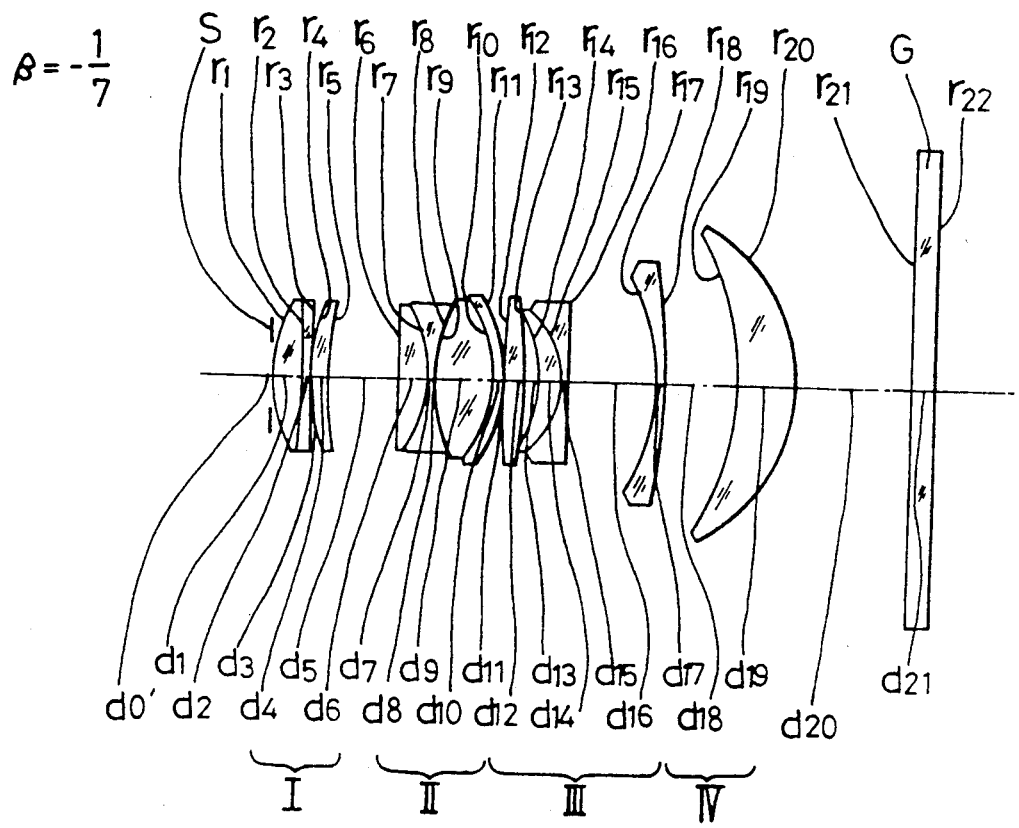
Figure 3B:
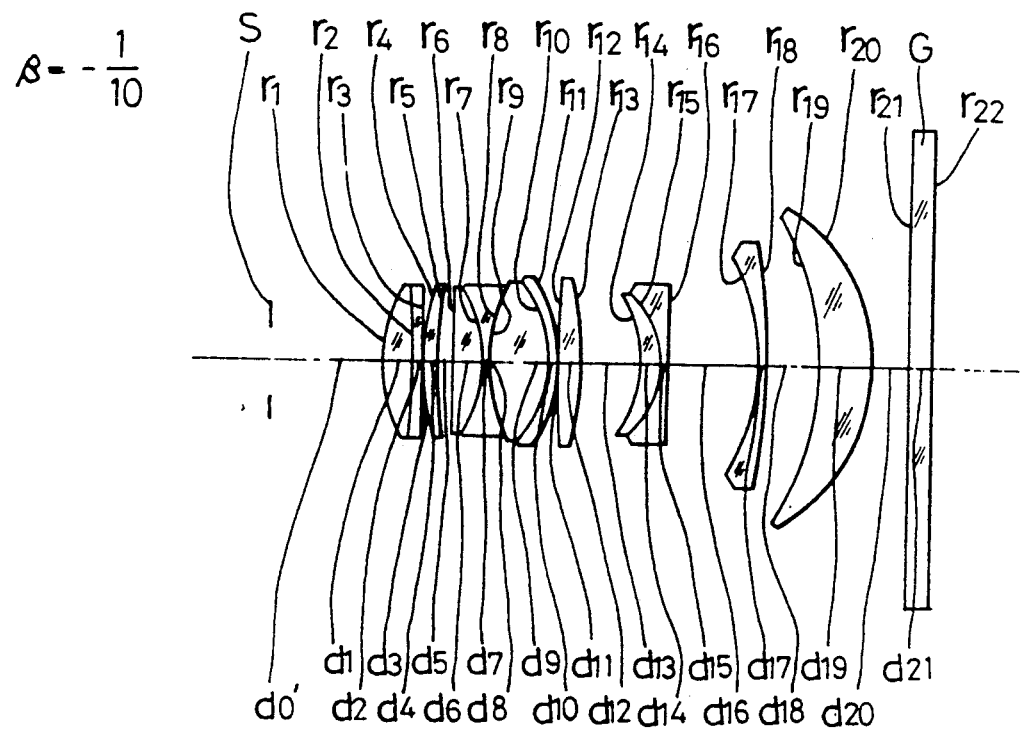
Figure 4A:
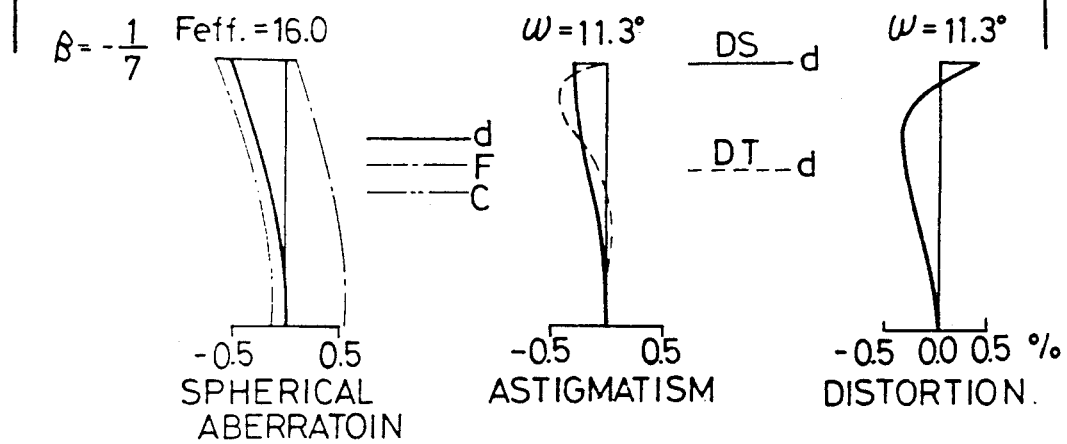
FIGS. 4A, 4B and 4C show aberration curves in the longest focal length condition, an intermediate focal length condition and the shortest focal length condition of the zoom lens system shown in FIGS. 3A and 3B.
Figure 4B:
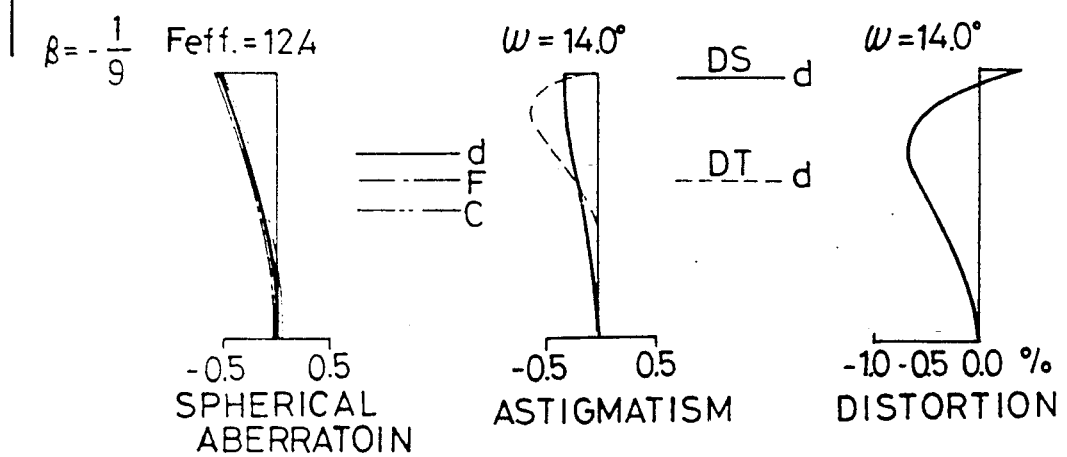
Figure 4C:
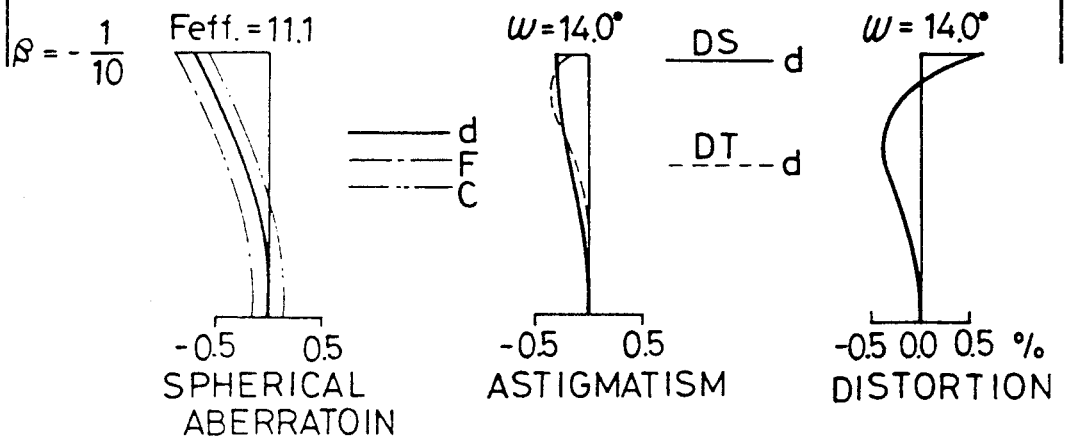

FIGS. 3A and 3B show a zoom lens system in a second embodiment of the present invention. This embodiment differs from the first embodiment in the third lens unit III. The third lens unit III in this embodiment includes a ninth, meniscus lens $G_9$ having a concave surface directed to the enlargement side, a tenth, negative concave lens $G_{10}$ cemented with the ninth lens $G_9$, and an eleventh, negative lens $G_{11}$ having a strong concave surface directed to the enlargement side.

Tables 1 and 2 show numeric data of the zoom lens systems in the first and second embodiments, i.e. radii of curvature, axial distances, refractive indices of the lens elements, and Abbe numbers of the lens elements. Numeric values for the conditional expressions of the respective embodiments are also shown.

FIG. 2A shows aberration curves of the first embodiment in the longest focal length condition. FIG. 3A shows aberration curves of the second embodiment in the longest focal length condition. FIG. 2B shows aberration curves of the first embodiment in the intermediate focal length condition. FIG. 3B shows aberration curves of the second embodiment in the intermediate focal length condition. FIG. 2C shows aberration curves of the first embodiment in the shortest focal length condition. FIG. 3C shows aberration curves of the second embodiment in the shortest focal length condition.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

TABLE 1 f/FNo. = 111.5/13.4~91.6/11.0~83.9/10.1
$\beta$ = −1/7~−1/9~−1/10
Ext. P. = −88~−76~−70

| | | S | RADIUS OF CURV. FIELD STOP | | AXIAL DISTANCE | REFRACT. IND. (Nd) | | ABBE No. (νd) | |
|---|---|---|---|---|---|---|---|---|---|
| | | | | $d_0'$ | 1.00~12.74~16.60 | | | | |
| I | $G_1$ | $r_1$ | 18.31 | $d_1$ | 4.40 | $N_1$ | 1.5173 | $\nu_1$ | 69.4 |
| | | $r_2$ | −54.63 | $d_2$ | 1.00 | $N_2$ | 1.8500 | $\nu_2$ | 40.0 |
| | $G_2$ | $r_3$ | 982.79 | $d_3$ | 0.15 | | | | |
| | $G_3$ | $r_4$ | 25.21 | $d_4$ | 1.96 | $N_3$ | 1.5182 | $\nu_3$ | 59.0 |
| | | $r_5$ | 33.79 | $d_5$ | 9.13~4.10~1.96 | | | | |
| II | $G_4$ | $r_6$ | 112.42 | $d_6$ | 4.22 | $N_4$ | 1.5927 | $\nu_4$ | 35.3 |
| | | $r_7$ | −15.99 | $d_7$ | 1.00 | $N_5$ | 1.8500 | $\nu_5$ | 40.0 |
| | $G_5$ | $r_8$ | 21.09 | $d_8$ | 0.26 | | | | |
| | $G_6$ | $r_9$ | 20.40 | $d_9$ | 7.62 | $N_6$ | 1.4875 | $\nu_6$ | 70.4 |
| | | $r_{10}$ | −14.16 | $d_{10}$ | 1.70 | $N_7$ | 1.8500 | $\nu_7$ | 40.0 |
| | $G_7$ | $r_{11}$ | −17.68 | $d_{11}$ | 0.20 | | | | |
| | $G_8$ | $r_{12}$ | 176.18 | $d_{12}$ | 2.27 | $N_8$ | 1.8467 | $\nu_8$ | 23.8 |
| | | $r_{13}$ | −64.89 | $d_{13}$ | 2.12~6.22~7.75 | | | | |
| III | $G_9$ | $r_{14}$ | −16.52 | $d_{14}$ | 3.14 | $N_9$ | 1.5673 | $\nu_9$ | 42.8 |
| | | $r_{15}$ | −10.70 | $d_{15}$ | 1.00 | $N_{10}$ | 1.8500 | $\nu_{10}$ | 40.0 |
| | $G_{10}$ | $r_{16}$ | 94.85 | $d_{16}$ | 0.20 | | | | |
| | $G_{11}$ | $r_{17}$ | 44.09 | $d_{17}$ | 3.94 | $N_{11}$ | 1.5927 | $\nu_{11}$ | 35.3 |
| | | $r_{18}$ | −53.81 | $d_{18}$ | 5.59 | | | | |
| | $G_{12}$ | $r_{19}$ | −21.45 | $d_{19}$ | 1.50 | $N_{12}$ | 1.8500 | $\nu_{12}$ | 40.0 |
| | | $r_{20}$ | −251.35 | $d_{20}$ | 11.97~10.36~8.99 | | | | |
| IV | $G_{13}$ | $r_{21}$ | −30.64 | $d_{20}$ | 6.49 | $N_{13}$ | 1.8467 | $\nu_{13}$ | 23.8 |
| | | $r_{22}$ | −22.14 | $d_{21}$ | 15.42~6.22~4.34 | | | | |
| | G | $r_{23}$ | ∞ | $d_{23}$ | 3.00 | $N_{14}$ | 1.5168 | $\nu_{14}$ | 64.2 |
| | | $r_{24}$ | ∞ | | | | | | |

$\Sigma d$ = 89.28
$\propto TL_L/f_L$ = 0.66
$f_L/f_1$ = 3.05
$f_L/f_{III}$ = 10.90
$D_{III}/f_L$ = 0.138

TABLE 2 f/FNo. = 114.2/13.4~93.6/11.0~85.4/10.0
$\beta$ = −1/7~−1/9~−1/10
Ext. P. = −100~−87~−79

| | | S | RADIUS OF CURV. FIELD STOP | | AXIAL DISTANCE | REFRACT. IND. (Nd) | | ABBE No. (νd) | |
|---|---|---|---|---|---|---|---|---|---|
| | | | | $d_0'$ | 1.00~12.70~16.43 | | | | |
| I | $G_1$ | $r_1$ | 18.64 | $d_1$ | 4.03 | $N_1$ | 1.5173 | $\nu_1$ | 69.4 |
| | | $r_2$ | −84.12 | $d_2$ | 1.00 | $N_2$ | 1.8500 | $\nu_2$ | 40.0 |
| | $G_2$ | $r_3$ | 170.23 | $d_3$ | 0.15 | | | | |
| | $G_3$ | $r_4$ | 27.60 | $d_4$ | 2.27 | $N_3$ | 1.4931 | $\nu_3$ | 83.6 |
| | | $r_5$ | 55.16 | $d_5$ | 9.77~4.26~2.00 | | | | |
| II | $G_4$ | $r_6$ | −13762.72 | $d_6$ | 3.87 | $N_4$ | 1.5927 | $\nu_4$ | 35.5 |
| | | $r_7$ | −16.72 | $d_7$ | 1.00 | $N_5$ | 1.8500 | $\nu_5$ | 40.0 |
| | $G_5$ | $r_8$ | 22.83 | $d_8$ | 0.26 | | | | |
| | $G_6$ | $r_9$ | 21.70 | $d_9$ | 7.73 | $N_6$ | 1.4875 | $\nu_6$ | 70.4 |
| | | $r_{10}$ | −14.53 | $d_{10}$ | 1.20 | $N_7$ | 1.8500 | $\nu_7$ | 40.0 |
| | $G_7$ | $r_{11}$ | −18.88 | $d_{11}$ | 0.20 | | | | |
| | $G_8$ | $r_{12}$ | 162.09 | $d_{12}$ | 2.67 | $N_8$ | 1.8467 | $\nu_8$ | 23.8 |
| | | $r_{13}$ | −47.10 | $d_{13}$ | 2.03~6.58~8.19 | | | | |
| III | $G_9$ | $r_{14}$ | −16.44 | $d_{14}$ | 2.89 | $N_9$ | 15.174 | $\nu_9$ | 52.5 |
| | | $r_{15}$ | −11.16 | $d_{15}$ | 1.00 | $N_{10}$ | 1.8500 | $\nu_{10}$ | 40.0 |
| | $G_{10}$ | $r_{16}$ | −286.78 | $d_{16}$ | 11.78 | | | | |
| | $G_{11}$ | $r_{17}$ | −27.39 | $d_{17}$ | 1.00 | $N_{11}$ | 1.8500 | $\nu_{11}$ | 40.0 |
| | | $r_{18}$ | −92.53 | $d_{18}$ | 9.82~8.39~6.88 | | | | |
| IV | $G_{12}$ | $r_{19}$ | −36.26 | $d_{19}$ | 7.10 | $N_{12}$ | 1.8467 | $\nu_{12}$ | 23.8 |
| | | $r_{20}$ | −23.50 | $d_{20}$ | 15.69~6.33~4.76 | | | | |
| | G | $r_{21}$ | ∞ | $d_{21}$ | 3.00 | $N_{13}$ | 1.5168 | $\nu_{13}$ | 64.2 |
| | | $r_{22}$ | ∞ | | | | | | |

$\Sigma d$ = 89.46
$\propto TL_L/f_L$ = 0.64
$f_L/f_1$ = 3.21

TABLE 2-continued f/FNo. = 114.2/13.4~93.6/11.0~85.4/10.0
β = −1/7~−1/9~−1/10
Ext. P. = −100~−87~−79

| S | RADIUS OF CURV. FIELD STOP | AXIAL DISTANCE | REFRACT. IND. (Nd) | ABBE No. (νd) |
|---|---|---|---|---|

$f_L/|f_{III}| = 11.25$
$D_{III}/f_L = 0.146$

What is claimed is:

1. A zoom lens system comprising, in order from an enlargement side, a first lens unit of a positive power, a second lens unit of a positive power, a third lens unit of a negative power, and a fourth lens unit of a positive power, wherein, during a magnification varying operation from a longest focal length condition to a shortest focal length condition, said first lens unit, said third lens unit and said fourth lens unit are movable simply from the enlargement side to a reduction side, said second lens unit being closet to said third lens unit in the longest focal length condition, and closest to said first lens unit in the shortest focal length condition, and wherein said zoom lens system satisfies the following conditions:

$$2 \leq f_L/f_I \leq 5$$

$$4 \leq f_L/|f_{III}| \leq 13$$

where $f_L$ is a focal length of the entire system in the longest focal length condition, $f_I$ is a focal length of the first lens unit, and $f_{III}$ is a focal length of the third lens unit.

2. A zoom lens system as claimed in claim 1, wherein said third lens unit of a negative power satisfies the following equation:

$$0.1 < D_{III}/f_L$$

where $f_L$ is the focal length of the entire system in the longest focal length condition, and $D_{III}$ is an overall thickness along an optical axis of the third lens unit.

3. A zoom lens system as claimed in claim 1, wherein said fourth lens unit of a positive power includes a meniscus lens having a concave surface directed to the enlargement side.

4. A zoom lens system as claimed in claim 1, further comprising a field stop fixed with respect to an image plane and disposed at a position adjacent an enlargement end of said first lens unit.

* * * * *